United States Patent [19]

Grimes et al.

[11] 4,101,886
[45] Jul. 18, 1978

[54] APPARATUS FOR CONSERVING ENERGY IN ELECTRICAL APPLIANCES

[76] Inventors: Johnny C. Grimes, 873 Grand Cir., Las Vegas, Nev. 89101; Richard L. Pierce, 6641 Sambar Cir., Cypress, Calif. 90630; Jimmy R. Payne, 3584 S. Bronco Rd., Las Vegas, Nev. 89102; Nate Schlaifer, 1314 Sweeney Ave., Las Vegas, Nev. 89104

[21] Appl. No.: 797,382

[22] Filed: May 16, 1977

[51] Int. Cl.² .............................................. G08B 1/00
[52] U.S. Cl. ........................................ 165/14; 340/15; 340/531; 340/539; 307/140
[58] Field of Search ................... 340/213 R, 220, 222, 340/224, 274 R, 309.1, 309.6, 412, 416, 417, 419, 420; 307/116, 140

[56] References Cited

U.S. PATENT DOCUMENTS

| | | | |
|---|---|---|---|
| 3,729,735 | 4/1973 | Dageford | 340/419 |
| 4,035,796 | 7/1977 | Hedly et al. | 340/417 |

Primary Examiner—Alvin H. Waring
Attorney, Agent, or Firm—Bacon & Thomas

[57] ABSTRACT

An apparatus for connecting and disconnecting appliances to an electrical supply, responsive to door activated switch means. A transmitter responds to entrance into a room by causing a receiver to activate a connecting means supplying an appliance with electrical energy. Upon closure of the door, a deadbolt must be engaged within the room within a predetermined period to maintain the appliances in their energized states. Release of the deadbolt to exit from the room causes the transmitter to enter a delay sequence, thereby providing an occupant with sufficient time to exit prior to de-energizing the appliances. Subsequent thereto, a signal is transmitted to the receiver for shutdown of the appliances. An overriding thermostat is provided to control heating and cooling appliances responsive to the transmitter, the thermostat having a broader thermal zone of operation than a typical thermostat controlling the heating and cooling appliances in the presence of the room occupant.

10 Claims, 4 Drawing Figures

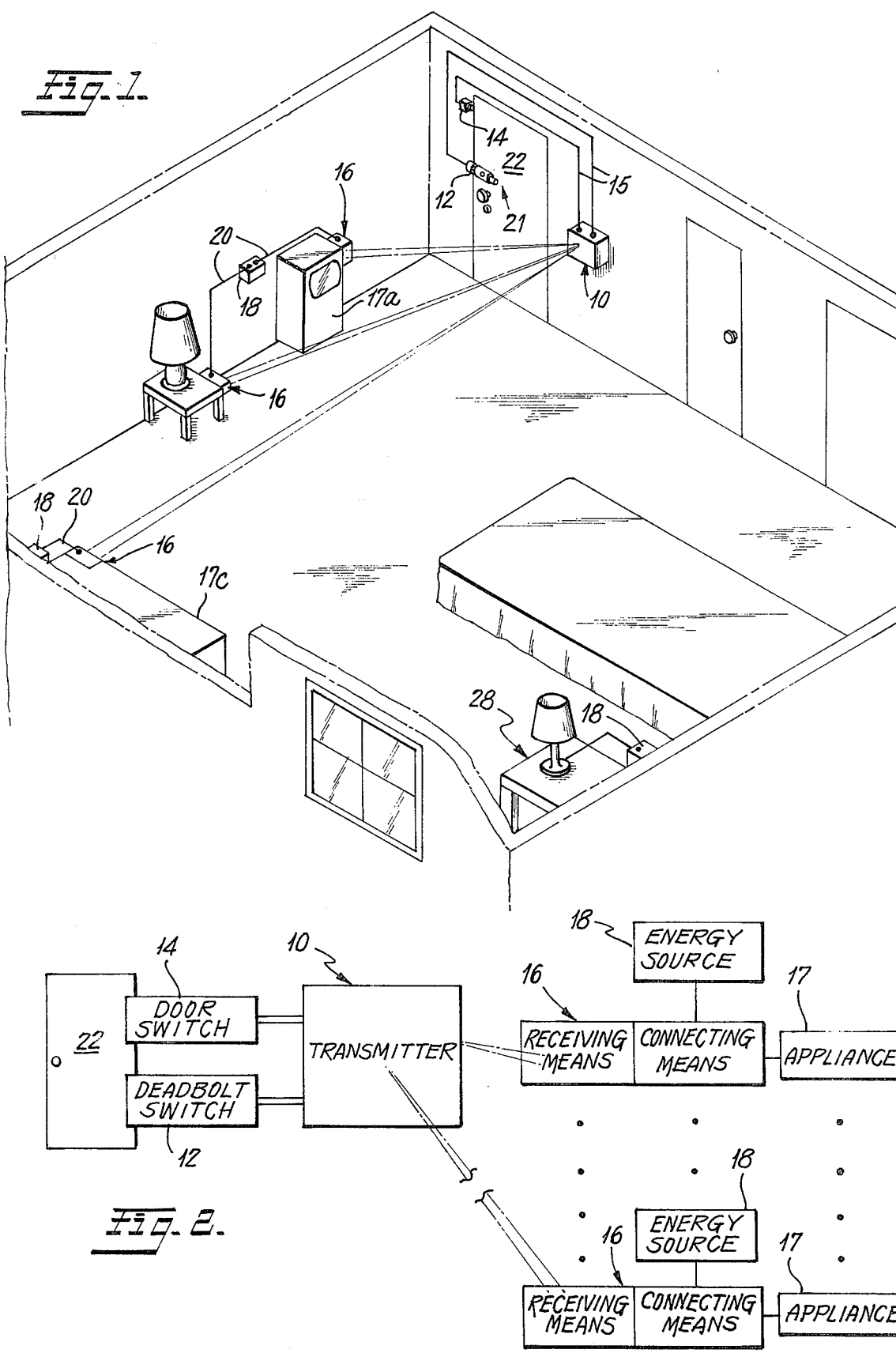

APPARATUS FOR CONSERVING ENERGY IN ELECTRICAL APPLIANCES

BACKGROUND OF THE INVENTION

1. Field of the Invention

This invention relates to a means for controlling and conserving the usage of energy, particularly of electrical energy by appliances operative in a room provided as an accommodation for a guest occupant. More specifically, a device is disclosed for controlling a plurality of appliances responsive to the presence or absence of the occupant, particularly as detected by door-activated switches.

2. Description of the Prior Art

While prior art devices tending to control air conditioning and heating devices responsive to opening of windows are known, e.g., Dageford U.S. Pat. No. 3,729,735, such devices function irrespective of the presence in a room of its occupant. The major concern therein is to avoid heating of cool external air, or cooling of warm external air brought in through an open window.

However, such devices do not pertain to a solution of the problem of guest comfort existing within the lodging industry. Specifically, guests are ordinarily supplied with appliances utilizing electrical energy which affect lighting, provide television and other amenities, and heat and cool the occupied room. However, guests are known to leave rooms after having availed themselves of the room comforts without disconnecting the various appliances or readjusting heating and cooling thermostats to acceptable levels for the unoccupied room prior to leaving.

Thus, while the majority of the time which a guest rents a room is spent by the guest externally of that room, electrical energy consumption continues throughout the period in many cases as if the guest were still present.

SUMMARY OF THE INVENTION

Accordingly, it is an object of this invention to provide an apparatus for controlling and conserving usage of electrical power in the absence of an occupant of a room.

Another object is to minimize usage of electrical power, yet to maintain a room in a habitable temperature range.

Yet another object is to provide for the disconnection of appliances from a source of electrical power responsive to opening of a deadbolt on a door.

A further object is to provide sufficient time for an occupant to leave a room subsequent to throwing a deadbolt on a door prior to disconnecting appliances from an electrical source therefor.

An additional object is to connect appliances within a room to a source of electrical energy therefor responsive to opening a door leading into the room.

Yet another object is to connect and disconnect appliances from a source of electrical energy therefor by the use of transmitting and receiving means, the transmitting means activated by switches responsive to door opening and deadbolt throwing.

A further object is to transmit ultrasonic signals for controlling receivers ultimately to disconnect or connect appliances to a source of electrical energy.

Another object is to use radio frequency signals for controlling means connecting and disconnecting electrical appliances to sources of electrical energy.

An additional object is to combine room security with an energy conservation device.

A further object is to provide an energy conservation system responsive to entry into and exit from a room.

These and other objects and advantages of the present invention will become apparent to those skilled in the art by reference to the following description of preferred embodiments thereof when taken in conjunction with the accompanying drawings wherein like reference characters refer to like elements throughout the views.

BRIEF DESCRIPTION OF THE DRAWINGS

FIG. 1 is a plan view of a guest room incorporating the present invention;

FIG. 2 is a block diagram representing the present invention;

DETAILED DESCRIPTION OF THE PREFERRED EMBODIMENTS

Figure 3:
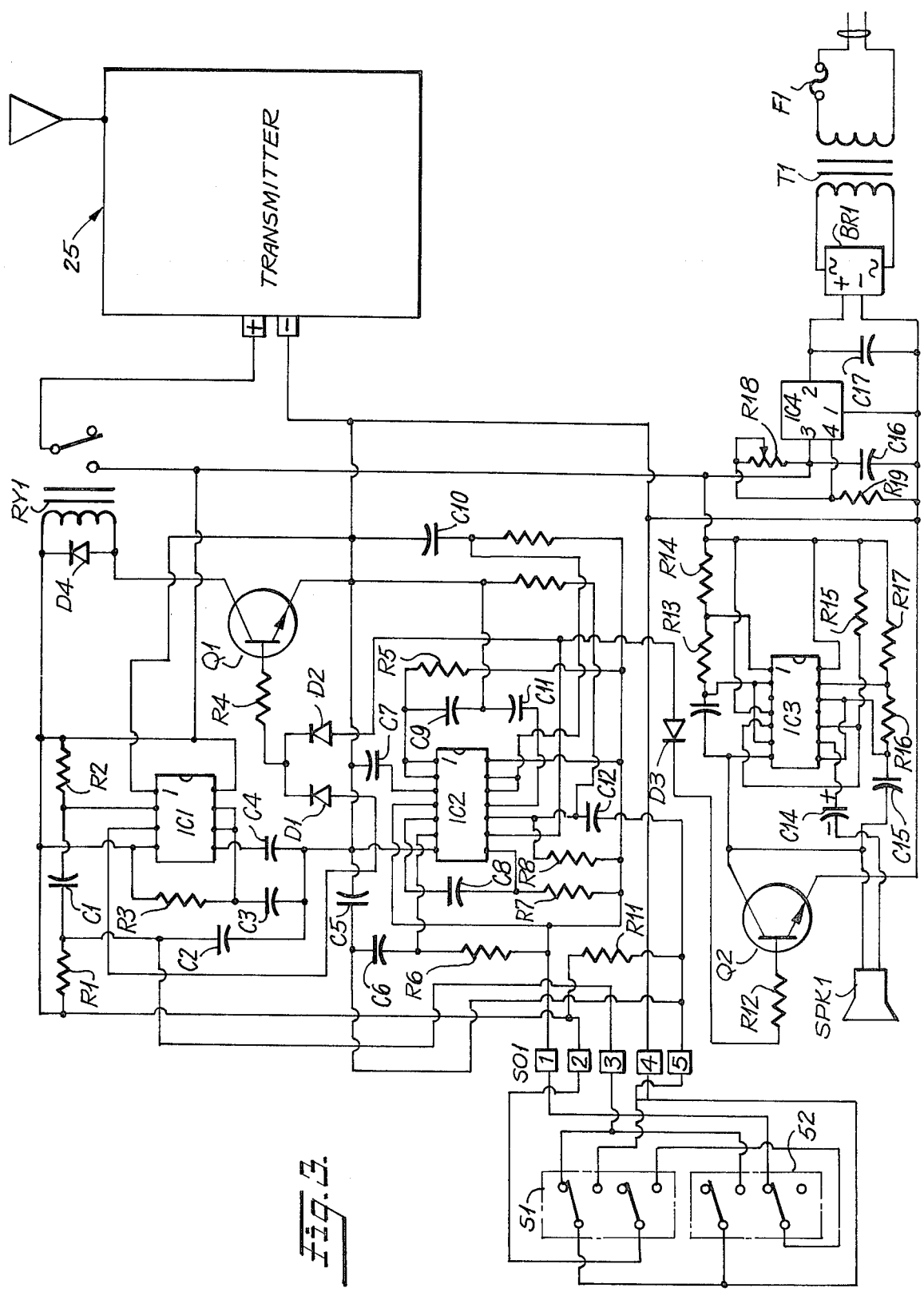
FIG. 3 is a circuit diagram of the transmitter.

In accordance with the objectives hereinabove set forth, the present invention is utilized in a room as shown in FIG. 1. A transmitter 10, activated by switches 12 or 14 through wiring connections 15, transmits signals which may be of any convenient form, including sonic, ultrasonic, rf, or optical, for example, to receivers 16 associated with various appliances 17, such as a television 17a, various lights 17b, and/or heating and cooling instruments 17c. The signals may also be transmitted directly over connecting wires between the transmitter and the receivers. The presently preferred embodiment contemplates the use of FSK (frequency-shift-keyed) rf signals to communicate between the transmitter and the receivers. Similarly, wiring connections 15 between sensing switches 12 and 14, and transmitter 10 may be replaced by other means of communication, such as rf signalling, etc.

Receivers 16 control the connection of the appliances 17 associated therewith to energy sources. The energy sources may be electrical outlets 18, to which the appliances are connected through normal wiring 20. Clearly, it is contemplated that other sources of energy which may be provided to a room occupant are also within the scope of this invention.

Referring now to FIG. 2, transmitter 10 is activated by a deadbolt switch 12 to transmit a signal to receiver 16 for disconnecting the appliances associated therewith from energy source 18. This signal is transmitted upon disengagement of the deadbolt 21, such as commonly done prior to opening door 22 for the purpose of leaving the room. The deadbolt is mounted on the interior side of door 22 and is combined with switch 12 to provide both security and the present energy conserving feature. It is appreciated, however, that the switch 12 may be independent of the deadbolt and may be located anywhere within the room and still provide the energy conservation features discussed infra. A delay means IC2, shown in FIG. 3, provides a 2½ minute delay prior to transmission of the "turn-off" signal by transmitter 10 subsequent to release of deadbolt 21 and the attendant activity of switch 12.

Turning now to FIG. 3, switches S1 and S2, both being double-pole-double-throw switches, are shown. Switch S1 represents the door activated switch and is shown in the door open position, while switch S2 represents the deadbolt activated switch and is shown in the open deadbolt position. The switches are activated responsive to engagement or disengagement of the deadbolt and opening or closing of the door. It is recognized that switch S1 may be independent of door 22, and may, instead, be associated with a manually operable switching means, a pushbutton, or even with the lock used to gain entry to the room. Moreover, while switches S1 and S2 are shown as double-pole double-throw switches, other switch configurations may be used as is apparent to those of ordinary skill in the art. Particularly, it is possible to utilize single pole switches in combination with logic devices to perform the functions of illustrated switches S1 and S2.

It is additionally within the scope of the present invention to utilize means other than a door and a deadbolt to detect an occupant's entrance to or exit from a room and to activate energy conserving means thereby. The present door and deadbolt associated switches are part of the presently preferred embodiment, but do not limit the invention thereto.

Responsive to opening of the door for the purpose of ingress to the room, switch S1, placed in the contact position shown, provides a signal to timing circuit IC1 to provide a 5 second timing pulse for the purpose of transmitting a "turn-on" signal by transmitter module 24. The transmitter module used herein is typically available as Model 22 manufactured by Linear Corporation in Glendale, Calif.

When door 22 is closed and the S1 contact arms are placed in their alternative position, with switch S2 still representing the open deadbolt, a 2½ minute delay pulse is provided by circuit IC2, which subsequently causes a 10 second pulse to be transmitted by transmitter module 24, causing the appliances to be turned off.

When switch S2 is closed, representing the engaged deadbolt position, timer IC2 is overridden and a constant ON signal is provided to the transmitter for the purpose of permitting normal operation of the room appliances 17. The receivers accordingly control the connecting means to provide constant connection of the appliances and the energy sources therefor. As a further feature of the invention, circuit IC3 is provided for the purpose of indicating to the room occupant, by means of speaker SPK1, that the 2½ minute delay is expiring, and that the deadbolt should be engaged, lest the appliances be turned off. A gentle beep signal is thus provided within 2½ minutes of the time an occupant enters a room, closes the door and neglects to engage the deadbolt. In those circumstances, it follows from the preceding description that timing circuit IC2 provides a 2½ minute delay prior to transmission of a signal to disconnect the appliances. Nonetheless, in the event that the occupant neglects to throw the deadbolt, one lighting appliance, shown as lamp 28 in FIG. 1, is provided without a receiver and control means, and remains unaffected by the transmitter and is directly connected to its source of energy. Accordingly, even in the event that an occupant neglects to engage his deadbolt, sufficient lighting remains within the room to permit correction of the error.

Figure 4:
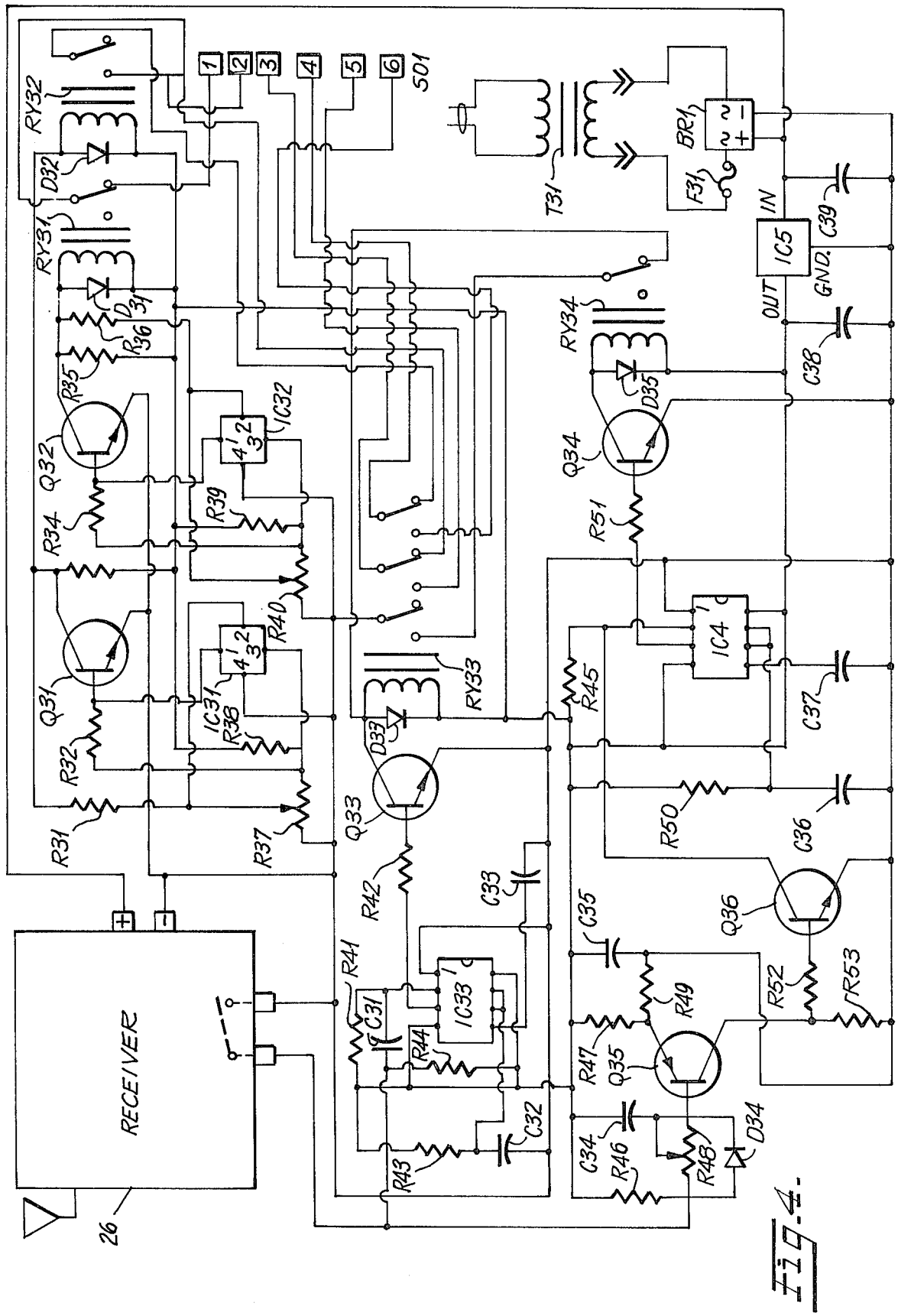
FIG. 4 is a circuit diagram of a control and connecting means for a thermostatically controlled appliance.

Turning now to FIG. 4, a receiver means 16 including and incorporating a control and a connecting means is shown, particularly for control of a heating and cooling unit. A receiving module 26, comprising for example receiver Model 61S, available from Linear Corporation in Glendale, Calif., receives the signals transmitted by transmitter 10. The decoded signal is used in the control means to energize and engage relays RY31 and RY32, activating the heating and cooling units, responsive to thermal sensors IC31 and IC32. Simultaneously, relay RY33 overrides and disconnects the room thermostat (not shown).

Thus, while other appliances such as 17a and 17b are disconnected, heating and cooling means 17c are reconnected to overriding thermostats which respond to different settings than provided by the occupant on his normal room thermostat. For example, where normal comfort settings may be in the range of 68° to 72° F, the present invention provides for a setting of 65° to 78° F in the occupant's absence from the room. That is, the heating unit will not turn on until the temperature drops below 65° F, and continue to function as needed to maintain that temperature. A cooling unit will not turn on until the temperature rises above 78° F, and continue to function as needed to maintain that temperature. Of course, different temperature values may be utilized.

Similar control and connecting means are provided for other appliances. The specific wiring connections for effecting control over the appliance responsive to reception of a signal by a particular receiver are similar to the connections of FIG. 4, but are not shown herein.

Tables 1 and 2 below provide a listing of components used in FIGS. 3 and 4, respectively. The various components are selected to perform the desired circuit functions. As is apparent to the routineers in the art, other components may be selected and other circuit configurations used without departing from the scope of the invention.

TABLE 1
TRANSMITER COMPONENTS

| | |
|---|---|
| IC1 | NE555v or equivalent Timer IC |
| IC2, IC3 | NE556 or equivalent TImer IC |
| IC4 | Ua78GUIC Voltage Reg. IC |
| Q1, Q2 | 2N3904 or equivalent Transistor |
| D1, D2, D3 | 1N914 Diode |
| D4 | 1N4006 or equivalent Diode |
| RY1 | 147-IC-12D Allied No. 802-1960 12v DC Relay |
| T1 | F-139P 12v Transformer |
| SO1 | Moles 6 Pin Connector |
| BR1 | 100 v 1.5 amp Bridge React. |
| S1 | Door Switch DPDT |
| S2 | Door Bolt Switch DPDT |
| SPK1 | Speaker 8 Ω Min. |
| F1 | Fuse 1 Amp & Holder |
| C17 | 470 uf 50 v Cap. Elect. |
| C2, C5, C16 | .1 uf Disc. cap. |
| C5, C7, C11 | .01 uf Disc. cap. |
| C1, C6, C8, C12 | .47 uf TAT. Cap. |
| C15 | .02 uf Disc. Cap. |
| C3 | 10 uf TAT Cap. Elect. |
| C9, C14 | 100 uf TAT Cap. Elect. |
| C10, C13 | 4.7 uf TAT Cap. Elect. |
| R1, R2, R6, R11, R7, R19 | 5.1K Ω  Resistor 5%  ¼W |
| R4, R12 | 1K Ω  Resistor 5%  ¼W |
| R5, R10 | 1 Meg. Ω  Resistor 5%  ¼W |
| R8, R16 | 10 K Ω  Resistor 5%  ¼W |
| R9 | 15 K Ω  Resistor 5%  ¼W |
| R3 | 220K Ω  Resistor 5%  ¼W |
| R13 | 27K Ω  Resistor 5%  ¼W |
| R14 | 330 K Ω  Resistor 5%  ¼W |
| R17 | .00K Ω  Resistor 5%  ¼W |
| R15 | 4.7 K Ω  5%  ¼W |
| R18 | 25 K Ω  Trimmer Pot |
| Model 22 | Transmitter Linear Corp. |

TABLE 2
RECEIVER COMPONENTS

| | |
|---|---|
| IC31, IC32 | LM 3911-46 TEMP. CONTROLLER |

TABLE 2-continued
RECEIVER COMPONENTS

| | IC |
|---|---|
| IC33,IC34 | NE55v TIMER IC |
| IC35 | MC7812P IC REG. |
| Q31,Q32,Q34,Q36,Q33 | 2N3904 or EQUIVALENT TRANSISTOR |
| Q35 | 2N3906 or equiv. TRANSISTOR |
| D31,D32,D33,D35 | 1N4006 or equiv. DIODE |
| D34 | 1N914 DIODE |
| RY31,RY32,RY34 | 802-1960 12v RELAY SPDT ALLIED |
| RY33 | 886-1355 12v RELAY 4PDT APPLIED |
| BR31 | 100v 1.5 amp BRIDGE RECT. |
| T31 | 24 VAC 450 ma. TRANSFORMER PLUG-IN-WALL |
| F31 | 2 amp. FUSE and HOLDER |
| SO31 | 9 PIN MOLEX SOCKET |
| C39 | 470 uf 50v ELECT. CAP. |
| C38 | .1 uf DISC. CAP. |
| C32 | 10 uf 25v ELECT. CAP. |
| C31 | .47 uf TAT ELECT. CAP. |
| C33,C37 | .01 uf DISC. CAP. |
| C34 | 100 uf 35v ELECT. CAP. |
| C35 | 47 uf 25v ELECT. CAP. |
| C36 | 4.7 uf 25v ELECT. CAP. |
| R42,R51 | 1K Ω 5%  ¼W  RESISTOR |
| R43 | 220KΩ 5%  ¼W  RESISTOR |
| R41,R44 | 5.1KΩ 5%  ¼W  RESISTOR |
| R33,R35,R45,R53 | 5%  ¼W  RESISTOR |
| R50 | 1 MEG.5%  ¼W  RESISTOR |
| R46 | 2.2KΩ5%  ¼W  RESISTOR |
| R38,R39,R47,R49,R52 | 3.3KΩ5%  ¼W  RESISTOR |
| R32,R34 | 20KΩ5%  ¼W  RESISTOR |
| R31,R36 | 22 Meg.Ω5%  ¼W  RESISTOR |
| R37,R40,R48 | 100KΩ TRIMMER POT |
| RECEIVER MODEL 61S LINEAR CORP. | |

In operation, a room occupant is given an instruction card on checking into a room. Use of the energy conservation device is disclosed therein, and instructions provided to engage deadbolt 21 upon entry into the room. An occupant following the instructions thus provides, within 2½ minutes of closing door 22, for switch S2 of FIG. 4 to override the timing circuits IC2 and maintain continual connection of the appliances 16 to their energy sources 18. A careless occupant who neglects to engage the deadbolt is reminded by the gentle beep sound emanating from speaker SPK1 that the delay period is over and that the deadbolt ought to be engaged.

Having engaged the deadbolt, the occupant may then proceed to control the appliances as he normally would, including setting of various temperature levels for the thermostatic controls to match his comfort level, lighting various lamps and activating a television set or other appliance provided for his comfort. On leaving the room, it has been the practice of hotel and motel occupants occassionally to leave the appliances connected, without bothering to disconnect same, thereby to waste energy. With the present invention utilized in such a room, release of the deadbolt to leave the room causes a 2½ minute delay sequence to be entered by circuit IC2, subsequently providing a signal by transmitter 10 to disconnect the various appliances from their energy source. Accordingly, sufficient time is provided for the guest to depart the room prior to disconnecting the appliances. Simultaneously with such disconnection, the heating and cooling appliances are placed under the control of auxiliary thermostats provided to maintain the room at temperature levels which are more conservative in energy consumption.

Subsequent reentry by the guest into the room causes the door activated switch S1 to trigger timer IC1 thereby providing a 5 second signal to reconnect the appliances and restore the heating and cooling units to their normal thermostatic control. Upon closing of the door subsequent to entry, the sequence repeats as previously disclosed herein.

Inasmuch as frequency shift keying is contemplated as the mode of signal transmission, it is possible to provide a different code for the transmitter of each room in a multi-room accommodation, thus permitting each room to be controlled by the occupant thereof upon ingress thereto or egress therefrom.

While preferred embodiments have been described herein, many variations thereof will become apparent to those with ordinary skill in the art. Such variations are within the scope of the present invention as recited in the appended claims.

What is claimed is:

1. A device for conserving energy consumption by appliances within a room having a door when the room is unoccupied by an occupant, which device comprises:
   (a) a source of energy;
   (b) means for connecting the appliances to the source of energy;
   (c) control means for causing the connecting means to connect or disconnect the appliances and the source of energy;
   (d) sensing means responsive to the ingress to and egress from the room by the occupant, which sensing means includes:
      1. first switch means responsive to activation by the occupant, and
      2. second switch means responsive to the opening and closing of the door; and
   (e) transmitting means activated and inhibited by the sensing means for transmitting control signals to the control means, thereby causing the appliances to be connected to or disconnected from the source of energy responsive to the ingress to or egress from the room by the occupant.

2. A device as recited in claim 1 wherein said transmitting means transmits ultrasonic control signals to said control means.

3. A device as recited in claim 1 wherein said transmitting means transmits radio frequency control signals.

4. A device as recited in claim 3 wherein said radio frequency control signals are transmitted in a frequency shift key code.

5. A device as recited in claim 1 wherein each appliance has its own control means.

6. A device as recited in claim 1 wherein said transmitting means comprises delay means for delaying transmission of said control signals to said control means.

7. A device for conserving energy consumption by appliances within a room having a door and dead bolt thereon when the room is unoccupied by an occupant, which device comprises:
   (a) a source of energy;
   (b) means for connecting the appliances to the source of energy;
   (c) control means for causing the connecting means to connect or disconnect the appliances and the source of energy;
   (d) sensing means responsive to the ingress to and egress from the room by the occupant, which sensing means includes:
      1. first switch means activated by the dead bolt, and
      2. second switch means responsive to opening and closing of the door in the room;
   (e) transmitting means activated and inhibited by the sensing means for transmitting control signals to the control means thereby causing the appliances to be connected to or disconnected from the source of energy responsive to the ingress to or egress from the room by the occupant; wherein (f) the first switch means, responsive to the release of the dead bolt, causes the transmitting means to enter a delay sequence prior to transmission of a signal to the control means for disconnecting the appliances from the source of energy; and (g) the second switch means, responsive to opening of the door when the dead bolt is in a released position, causes the transmitting means to transmit a signal to the control means for connecting the appliances to the source of energy.

8. A device as recited in claim 7 wherein said second switch means, responsive to opening of said door when said deadbolt is in a released position, further prevents said transmitting means from entering said delay sequence.

9. A device as recited in claim 7 wherein said first switch means, responsive to engagement of said deadbolt, causes said transmitting means to transmit a signal to said control means for connecting said appliances to said source of energy.

10. A device as recited in claim 1 wherein:

(a) said appliances include thermostatically controlled heating and cooling means responsive to a first thermally responsive control means, (b) said control means comprises a second thermally responsive control means for controlling said heating and cooling means and operable at a different temperature range from said first thermally responsive control means, wherein (c) the temperature in said room is permitted to vary over wide ranges not normally acceptable for the comfort of the occupant during periods of absence of the occupant from the room, thereby providing further reduction in energy consumption in said room.

* * * * *